UNITED STATES PATENT OFFICE.

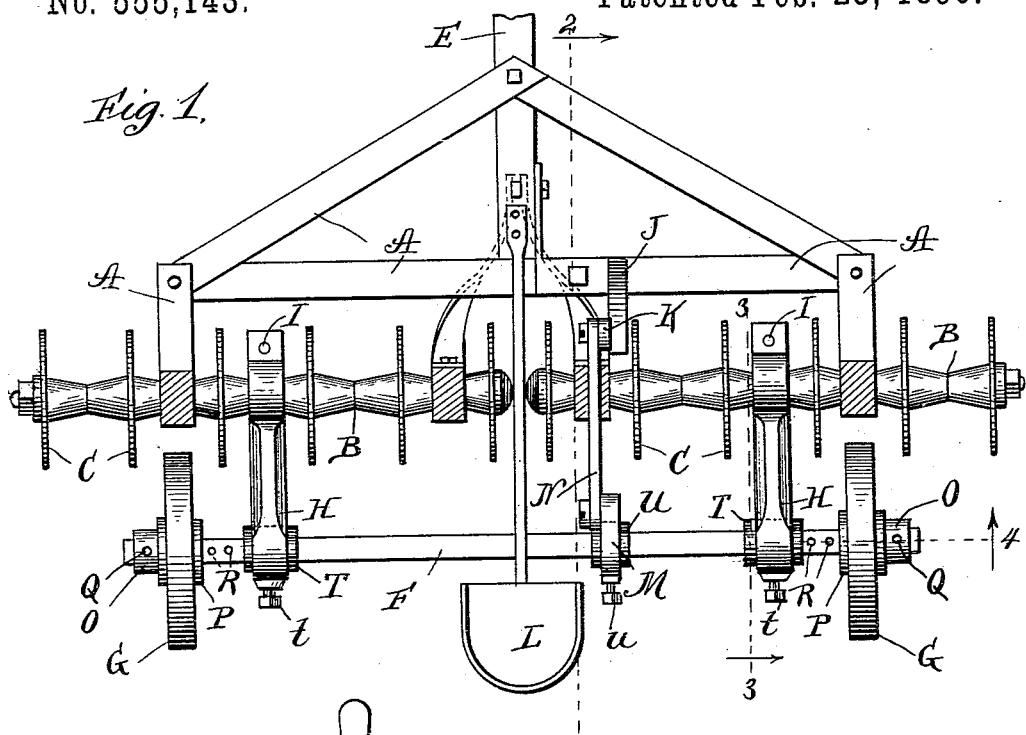

LARS T. WICKS, OF NEWARK, ASSIGNOR OF ONE-HALF TO GEORGE W. GURLEY, OF SANDWICH, ILLINOIS.

DISK HARROW.

SPECIFICATION forming part of Letters Patent No. 555,143, dated February 25, 1896.

Application filed September 28, 1895. Serial No. 564,014. (No model.)

*To all whom it may concern:*

Be it known that I, LARS T. WICKS, a citizen of the United States, residing at Newark, in the county of Kendall and State of Illinois, have invented a certain new and useful Improvement in Disk Harrows, which is fully set forth in the following specification, reference being had to the accompanying drawings, in which—

Figure 1 is a plan view of the disk harrow with my improvement attached. Fig. 2 is a vertical sectional view taken at the line 2 2, Fig. 1, looking to the right. Fig. 3 is a vertical view of a portion of the machine, taken at the line 3 3, Fig. 1, looking to the right. Fig. 4 is a sectional view taken at the line 4, Fig. 1. Fig. 5 is a sectional view taken at the line 5 5, Fig. 1, looking to the right; and Fig. 6 is a perspective view of an axle-sleeve detached.

The object of my invention is to attach to a disk harrow a supplemental wheel-carried axle, from which axle the harrow can be thrown from the ground by the operator riding on the harrow, and locked in that elevated position to be driven from place to place.

My invention also consists in the method of attaching the wheels to the axle, whereby the wheels can be adjusted on the axle; and also in the special attachment of the elevator axle-arms to the harrow, all of which is hereinafter fully described and made the subject-matter of the claims.

In the accompanying drawings, A represents the frame; B, the disk-axles; C, the disks; E, the tongue; F, the supplemental axle carried by wheels G.

The frame of the disk harrow, the attachments for varying the angle of the disk-axles, and the lever attachments for controlling the disks may be constructed in any of the well-known ways. H are arms supported on the axle F. They are made adjustable thereon by means of the sleeves T, which are rigidly secured to the axle, the arms being rotatable on the sleeves and held at any point of adjustment by set-screws *t*.

The sleeves T may be dispensed with, provided the axle is made of such shape to admit of the arms being rotatable so as to adjust them at different inclinations thereon. The free ends of these arms are bifurcated to receive the disk-axle B, as clearly shown in Figs. 2 and 3.

I is a pin passing through the flanges on the bifurcated ends of the arms H, to secure the bifurcated arms on the disk-axle when desired.

J is a support rigidly attached to the frame of the harrow, to which is pivoted a lever K, which lever is within reach of the seat L, which is mounted on the frame of the harrow.

M is an arm secured to the supplemental wheel-carried axle F by means of a sleeve U, on which the arm is rotatable, and held in its desired position by a set-screw *u*. The sleeve might be made in the form of a socket to receive one end of the arm, it being made rotatable on the axle.

N is a connecting-arm, one end of which is pivoted to the arm M and the other end to the lever K, some distance from the point at which it is pivoted to the standard or support J.

It will be seen that when the operator takes hold of the lever K and throws it down into the position shown by dotted lines in Fig. 2 the arm M is thrown back, turning the supplemental axle F, thereby raising the lifting-arms H, at the same time raising the harrow-frame and elevating the disks above the ground. This raising of the harrow is accomplished in this manner from the fact that the tongue of the harrow is supported in the neck-yoke of the harness of the team.

When the harrow is thrown into its elevated position, its weight is supported in part by the neck-yoke of the team and in part on the wheels carrying the supplemental axle. The driver is raised with the harrow, and by the connection above described between the supplemental axle and the harrow he is enabled to raise himself with the harrow either by using his hands or the levers may be adjusted so that he can operate them with his feet.

By using the connecting device between the harrow and supplemental axle above described the lever is locked to hold the harrow elevated, when the point at which the connecting-bar N is pivoted to the lever K passes below the point at which the lever K is pivoted to the standard J. It will be seen, however, that any other arrangement of connecting-levers could be used, and a suitable device used for fastening the lever with which the harrow is elevated in position to lock the harrow in its elevated position.

I have not shown the levers and their connections with which the operator sitting on the seat of the harrow can elevate the harrow, together with his own weight, by foot-power. It would only be necessary to carry the operating-lever in such proximity to the seat as to enable the operator to reach it with one of his feet and so connect it with the harrow-frame and the arm on the supplemental axle as to cause the supplemental axle to raise the harrow when the lever is vibrated. In such case the driver could hold the foot-lever in position to keep the harrow elevated as he was driving to and from the field to be harrowed, thereby obviating the necessity of locking the lever to hold the harrow in its elevated position; but it would be much more convenient to lock the lever.

So far as I know I am the first to attach to a disk harrow a supplemental wheel-carried axle trailed behind the harrow so connected to the harrow that the axle could be turned and raise the harrow from the ground and locking the axle to the harrow in such position as to hold the harrow elevated, so that it could be driven to and from the field, its weight being carried on the supplemental wheel-carried axle and the neck-yoke of the team. Such locking device was shown in my pending application, Serial No. 548,403, but that locking device was so arranged in connection with the supplemental wheel-carried axle that the operator was obliged to dismount from the machine, then elevate the harrow and connect the locking device between the supplemental axle and the harrow while on the ground. I, in my improvement in this application, have attached such levers to the harrow and so connected them with the supplemental axle as to enable the operator while on the harrow to raise it, together with his own weight, so that it can be carried in an elevated position from field to field.

The wheels G revolve on boxes O, which have flanges P on their inner ends. These boxes are longer than the length of the hub of the wheel and have pin-holes through them to receive the locking-pins Q. These boxes O are made to conform to the shape of the end of the axle F. The axle may be rectangular or round or any other form, the boxes being made of corresponding form to fit on the end of the axle and may be adjusted to any desired position on the end of the axle so as to bring the wheels G into the desired position on the axle. There are also pin-holes R in the ends of the axles to receive the locking-pins Q.

To assemble the parts, the box O is slipped upon the end of the axle to the desired position. The wheel is then placed upon the box, the inner end of the hub of the wheel being carried against the flange P on the inner end of the box, when the pin Q is inserted through the holes in the outer end of the box and also one of the holes in the axle. This construction makes a very cheap and at the same time a desirable form of construction of the parts which attach and hold the wheels in position on the axle. It will be seen that the wheels G can be adjusted on the axle F to such positions relative to each other as to most advantageously balance the weight of the harrow when it is elevated to be carried by the wheels.

The elevating-arms H can be made of any desired shape, either straight or curved; but it is desirable that their bifurcated ends be of such shape that when the axle is trailed behind the harrow the upper portion of the bifurcated end shall fit upon the disk-axle, and the under portion shall fit upon the under side of the disk-axle when the arms are thrown upward to elevate the harrow. For the purpose of preventing the bifurcated ends of these arms from slipping off of the axles when this change of position of the bifurcated ends of the arms relative to the disk-axles is taking place I have provided the upper and lower portions of the bifurcated ends of these arms with flanges S, in which I insert pins I. These pins can be readily removed when it is desired to disconnect the supplemental axle from the harrow.

Having fully described the construction and operation of my machine, what I claim, and desire to secure by Letters Patent, is—

1. In a harrow, a wheeled attachment comprising a supplemental axle; wheels loosely mounted on the said axle; arms rigidly attached to the said axle, and pivotally and detachably connected to the harrow; a lever-arm mounted on the said supplemental axle rigidly, and adapted to rotate the same, whereby the harrow is raised or lowered; and means for locking the said supplemental axle when the harrow is raised.

2. In a harrow, a wheeled attachment comprising a supplemental axle; wheels loosely mounted on the ends thereof; arms rigidly attached to the said supplemental axle, and pivotally and detachably connected to the harrow; a lever-arm rigidly mounted on the said supplemental axle; a lever device connecting the said lever-arm and the harrow, and adapted to rotate the supplemental axle; and means for locking the said lever device.

3. The harrow, a supplemental axle connected to the harrow by elevating-arms; wheels carried by the said supplemental axle; a lever, K, pivotally connected to the harrow-frame; an arm, M, rigidly connected to the supplemental axle; and an arm, pivotally connected with the arm M and the lever K, for elevating the harrow and throwing its weight upon the supplemental wheel-carried axle.

4. The non-rotatable axle R; the adjustable boxes O, loosely adjustable on the end of the axle, the boxes being provided with flanges at one end and mechanisms on the opposite end for securing them to the axle in any desired position and the wheels G mounted and revolving on the said boxes.

5. In a wheeled attachment for a harrow, substantially such as described, the supplemental axle R, having elevating-arms, H, adapted to be connected to the harrow by means of their front ends being bifurcated; the flanges S on said bifurcated arms; and pins, I, for locking said bifurcated arms to the harrow.

LARS T. WICKS.

Witnesses:
S. B. STINSON,
C. A. PHELPS.